US007006524B2

(12) United States Patent
Freeman et al.

(10) Patent No.: US 7,006,524 B2
(45) Date of Patent: Feb. 28, 2006

(54) MODULAR SCADA COMMUNICATION APPARATUS AND SYSTEM FOR USING SAME

(75) Inventors: Mitchell B. Freeman, San Jose, CA (US); Edee M. Harris, Gilroy, CA (US)

(73) Assignee: Natis Communications Corporation, Gilroy, CA (US)

( * ) Notice: Subject to any disclaimer, the term of this patent is extended or adjusted under 35 U.S.C. 154(b) by 456 days.

(21) Appl. No.: 10/170,977

(22) Filed: Jun. 12, 2002

(65) Prior Publication Data

US 2004/0156352 A1    Aug. 12, 2004

(51) Int. Cl.
*H04J 3/16*    (2006.01)
*H04J 3/22*    (2006.01)

(52) U.S. Cl. ............... 370/465; 370/351; 370/355; 370/466; 455/445; 455/426.1; 455/552.1; 455/557; 700/9; 700/12

(58) Field of Classification Search ........ 370/351–355, 370/465, 466; 455/445, 426.1, 552.1, 557; 700/9, 12

See application file for complete search history.

(56) References Cited

U.S. PATENT DOCUMENTS 5,748,104 A    5/1998    Argyroudis et al.
6,826,405 B1 *    11/2004    Doviak et al. ............ 455/445
2001/0010716 A1    8/2001    Smith et al.
2002/0147503 A1 *    10/2002    Osburn, III ................ 700/9
2002/0152268 A1 *    10/2002    Kureshy et al. .......... 709/203

FOREIGN PATENT DOCUMENTS

WO        WO 98/53581        11/1998

OTHER PUBLICATIONS

International Search Report, PCT/US 03/18654, Jan. 27, 2004.

* cited by examiner

*Primary Examiner*—Wellington Chin
*Assistant Examiner*—Raj Jain
(74) *Attorney, Agent, or Firm*—Sonnennschein, Nath & Rosenthal LLP

(57) ABSTRACT

A SCADA communication apparatus is made up of a set of modules, a first one of which is adapted for communication with a remote terminal unit (RTU), a second one of which is adapted for communication with a communications transceiver, and a third one of which is adapted for routing messages between and to physically house the first and second ones of the modules. Optionally, encryption and/or data compression can be provided by the operating system associated with the communication apparatus; or, these features may be provided in the form of application programs.

14 Claims, 4 Drawing Sheets

MODULAR SCADA COMMUNICATION APPARATUS AND SYSTEM FOR USING SAME

FIELD OF THE INVENTION

The present invention relates to communication devices for use in Supervisory Control and Data Acquisition (SCADA) systems and, in particular, to a modular communication device suitable for use in and with such systems.

BACKGROUND

SCADA systems have long been used in a variety of utility markets, such as natural gas collection and distribution, power generation and distribution, water distribution, oil fields and distribution systems, etc. In general, these systems employ a number of remote terminal units (RTUs) in conjunction with various pieces of field equipment (reclosers, switches, pumps, interrupters, capacitor banks, etc.). The RTUs are essentially communication interfaces and may be integrated directly into the field equipment, or, more often, are connected to the field equipment as external communication units. The RTUs are periodically interrogated or "polled" by a central unit, and the RTUs respond with data gathered from their associated field equipment or systems. The interrogation may be specific (meaning that the central unit contacts a specific RTU using some form of unique identifier), or global (in which case the central unit sends a single poll and all of the RTUs that receive the poll respond sequentially according to some predetermined order of response).

SCADA RTUs are available from a number of vendors and have a variety of forms. In general, however, all RTUs act as communication interfaces for whatever pieces of field equipment they are associated with. A communication device (e.g., a modem or the like) connected to the RTU enables communications between the RTU and the central unit over a communications network (e.g., the PSTN other network). This presents a problem because each of these communication devices is designed to be specific in purpose. That is, each communication device is designed to be used for one particular application, for example, one particular form of communication link to/from the central unit. Thus, while some communication devices may be configured for communication over a cellular network, others may only be configured for use with leased lines or satellite communication links.

This latter point is important because having a variety of different communication mechanisms to/from the central unit of a SCADA system generally means that similar transceiver systems must be deployed both at the remote site and at the central office or other site. This leads to the undesirable situation of having a dedicated receiver for each (or at best a few) RTU/field equipment piece that is deployed. Such a communication system is both costly and difficult to maintain.

Some vendors have attempted to solve this problem by providing apparatus that integrate the RTU and the communication device. For example, the series 33XX RTUs produced by Bristol Babcock of Watertown, Conn. appear to allow a user to customize a general form of RTU for a specific application by ordering the RTU with one of a number of available communication cards. The problem with this approach of semi-custom RTUs is that one is still left with the problem of providing dedicated transceivers for each variant of communication interface. Further, each semi-custom RTU is capable of interfacing with only a specific piece of field equipment.

A further problem with many existing SCADA systems is that they do not provide a secure form of communication between the RTU and the central unit. Thus, unauthorized persons may be able to monitor or interfere with transmissions or even be able to insert unauthorized communications into the SCADA network, possibly compromising the system being monitored/controlled. Finally, current SCADA systems still require field service personnel be dispatched whenever historical information is to be retrieved from an RTU. That is, the RTU-to-central unit communication system does not support the transmission of large data files, such as history logs and the like.

What is needed therefore is an improved SCADA communication device.

SUMMARY OF THE INVENTION

In one embodiment, a SCADA communication apparatus is provided. The apparatus is made up of a set of modules, a first one of which is adapted for communication with a remote telemetry unit (RTU), a second one of which is adapted for communication with a communications transceiver, and a third one of which is adapted for routing messages between and to physically house the first and second ones of the modules.

BRIEF DESCRIPTION OF THE DRAWINGS

The present invention is illustrated by way of example, and not limitation, in the figures of the accompanying drawings in which.

DETAILED DESCRIPTION

Described below is a modular SCADA communication apparatus and a related system in which this apparatus finds particular use. The SCADA communication apparatus will be referred to herein as a Universal Hub (UH). The UH is a remote communications device that allows for the transmission and reception of messages between an Operations Center (OC) and one or more remote equipment units located in the field (i.e., in locations remote from the OC). The "remoteness" of the equipment is a relative concept. In some cases, it may refer to equipment units and related UHs located many miles from the OC in uninhabited or sparsely inhabited areas that are not easily accessible. In other cases, it may refer to equipment and UHs that are merely located in another room of a building. The common factor among these disparate "remote" locations and equipment units is the need to communicate information to the OC and/or to receive operational commands therefrom.

The remote equipment may be any form of equipment that is commonly monitored and/or controlled through SCADA systems. For example, pumps, flow meters, generators, pneumatic devices, switches, gauges and the like are all common components of SCADA systems. The present invention does not necessarily concern the design of such equipment; rather, the present invention is primarily directed to a communication apparatus that acts as an interface between this different forms of equipment and the different forms of communication links that may be used to relay messages between the pieces of equipment and the OC.

The present invention is discussed below in terms of presently preferred embodiments thereof, however, this discussion is not meant to limit the scope of the invention. By studying the present disclosure, others of ordinary skill in the art may recognize equivalent procedures, materials or structures that can be substituted for those described herein to achieve the same effect. The reader is advised and reminded that the use of such equivalents is deemed to be within the scope of the present invention. For example, where the discussion refers to well-known structures and devices, block diagrams are used, in part to demonstrate the broad applicability of the present invention to a wide range of such structures and devices.

Figure 1:
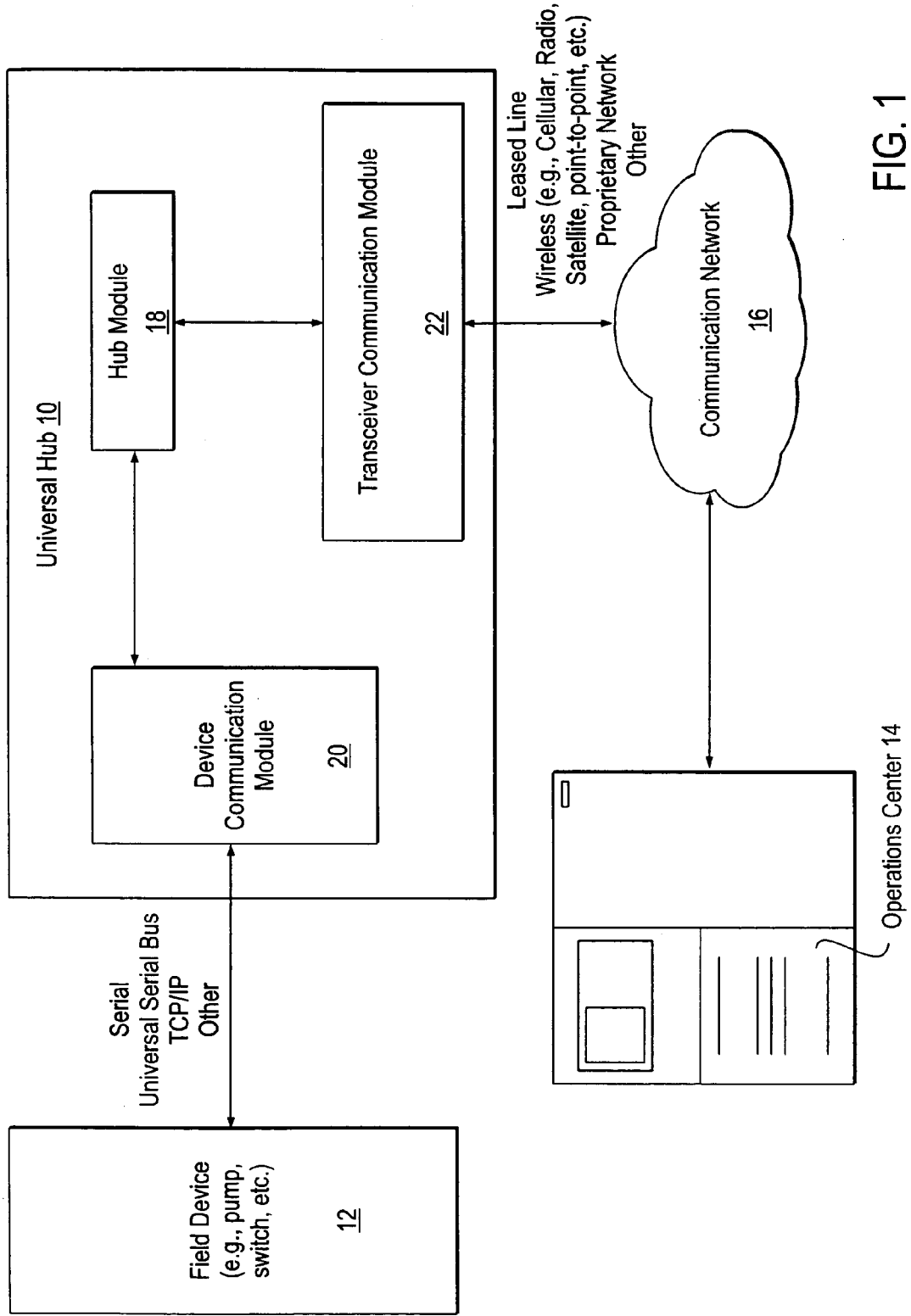
FIG. 1 illustrates one example of a system that employs a universal hub for a SCADA system configured in accordance with an embodiment of the present invention.

Before describing the UH in detail, it is helpful to discuss the overall system in which it is used. One example of such a system is shown in FIG. 1. The UH 10 is deployed in the field between the RTU/field equipment piece 12 and the OC 14. The UH communicates with the OC via a communications network 16. This communications network may be any form or forms of such a network, including leased lines, cellular or other wireless communication links (including radio, microwave and/or satellite communication links), or a proprietary network that is provisioned by the network operator.

In some cases, the communication network may make use of the Motorola iDEN network, which is used by Nextel Communications for its cellular and two-way radio (Direct Connect™) service. In such cases, the UH 10 may make use of the Nextel iO1000 modem, which is adapted for use with this network. Use of this network and modem combination provides particular advantages because the present inventors have found that the Nextel Direct Connect service often provides communication access in and to areas where ordinary cellular telephone communications are not possible or are less superior than the Direct Connect service. Thus, SCADA network operators can realize the advantages of using an already deployed, commercial wireless network, without suffering the communication gaps and losses that are common to other cellular telephone networks.

As more fully described below, the UH 10 employs a modular design that, in one embodiment, will accommodate a type II or III PCMCIA card as the transceiver communication module. The Nextel iO1000 modem uses an industry-standard Type III form factor and serial interface. Thus, the present UH 10 is compatible for use with this modem. Other network operators that offer similarly compatible (in terms of form factor) modems include AT&T Wireless (for CDPD and GPRS network) and Cingular (for GSM and GPRS networks).

UH 10 includes three primary modules. At its core, UH 10 includes a hub module 18. Hub module 18 is a programmable module (e.g., that includes a general purpose programmable microprocessor or reduced instruction set processor along with computer readable instructions stored in a non-volatile memory, or a field programmable gate array or similar device with a boot ROM, etc.) that includes the computer-readable instructions (software) that controls the operation of UH 10 and provides a routing and transcoding/protocol conversion function for messages passing between device communication module 20 and transceiver communication module 22. In addition, UH 10 may include software and/or hardware that allow UH 10 to respond to specific and/or global polls by OC 14.

Communications between the RTU/field equipment 12 and the OC 14 are bi-directional, but not necessarily full duplex—only one component needs to transmit data at any one time. In most cases, communications are initiated by the OC 14, which instructs the RTU associated with the field device to report on the current status of the monitored equipment. The RTU responds by relaying information to the OC 14, including any data collected from the monitored equipment and/or information regarding the current health of that equipment.

In some cases, communications will be initiated by the RTU itself. For example, in situations where the RTU senses a fault with the field equipment, or the operational parameters of the RTU have been exceeded in some sense that constitutes an alert situation, the RTU may report the fault or alert condition to the OC 14 without waiting for a poll. In such cases, the UH 10 transfers this information to the OC 14 so that network operators can make appropriate decisions and take action accordingly.

In each case, communications between the OC 14 and the RTU/field equipment 12 are passed through UH 10. Communications from the OC 14 are received at UH 10 at the transceiver communication module 22, routed through the hub module 18 and provided to the device communication module 20. In other embodiments, the messages may be passed directly from the transceiver communication module 22 to the device communication module 20. From the transceiver communication module, the messages from the OC 14 are passed to the RTU/field equipment 12. Any messages from the RTU/field equipment 12 to the OC 14 follow a reverse path through the UH 10.

Having thus described the overall system in which the UH 10 operates, we turn now to a more detailed discussion of the UH 10 itself and the modules that are included therein. The UH 10 is designed on a "hub and spoke" philosophy in that it acts as a hub for a variety of different communication links (spokes) between the RTU/field equipment 12 and the OC 14. The UH 10 thus allows for a common communication protocol to/from the OC 14, regardless of the physical communication medium that is used. This is an advantage for network operators because it means that individual communication mechanisms for communicating with disparate types of RTUs need not be employed at the OC 14. Further, as discussed in detail below, the UH 10 can be a common platform for receiving device communication modules 20 having different physical connectors for connection to different forms of field equipment and/or RTUs.

Transceiver communication module 22 is versatile in the sense that it is able to accommodate a number of different methodologies in its communication role with the OC. In one embodiment, transceiver communication module is adapted to allow for communication via the following alternatives:

i. Leased Line, e.g., via an analog or digital (e.g., ISDN or DSL) modem,
ii. PCMCIA/CardBus Communications Interfaces, including:
   1. Cellular/CDPD (Cellular Digital Packet Data)/GPRS (GSM Packet Radio System),
   2. Wireless RF/Point-to-Point/Microwave,
   3. Satellite,
   4. Other custom/proprietary interfaces,
iii. Serial Communication Interfaces, including:
   1. RS-232,
   2. RS-422,
   3. RS-485
   4. USB 1.1/2.0,
   5. Other serial connections/protocols,
iv. TCP/IP or other LAN communication protocols, e.g., via an Ethernet or other data communications interface,
v. Other implementations of one of the above alternatives (e.g., other satellite communication interfaces having other than PCMCIA form factors).

Typically, one of these methods will be selected as a primary connection for the transceiver module 22.

The hub module 18 provides power for the transceiver communication module 22. In particular, the UH 10 acts as a centralized power distribution module, providing appropriate power to the transceiver communication module 22 as required. Power redundancy and failover operation (e.g., from primary power to emergency battery backup power or similar secondary power supply) are provided for in the event of power failures.

The transceiver communication module 22 has three main functions:
i. Transferring data to and from the Hub module 18;
ii. Optionally encrypting and decrypting data transmitted to/received from an associated transceiver; and
iii. Communicating with the OC 14 (via the associated transceiver).

For example, if cellular communications are used, meaning that the transceiver associated with transceiver communication module 22 is adapted to communicate with OC 14 via a cellular communication network, then transceiver communication module 22 will format data received from hub module 18 in a form that can be received and understood by the cellular transceiver. The transceiver itself (e.g., the Nextel iO1000 modem), however, will be responsible for formatting the data according to the actual communication protocol used by the cellular network. Thus, in the case of the Nextel iO1000 modem, the transceiver communication module 22 will format data for transmission across a serial bus to the modem, using the electrical signal levels and other conventions associated with the PCMCIA III communication interface, but the modem will then reformat the data for transmission according to the iDEN network communication protocols. In some cases, it may be necessary for the data being transferred between the transceiver communication module 22 and its associated transceiver to be encrypted/decrypted (as appropriate) on each side of the interface. This is to prevent unauthorized snooping of the data in sensitive installations.

The transceiver communication module 22 can be designed to provide a secondary transceiver communication connection to be used as a failover or secondary (alternate) communications route in the event that the primary (favored) route is inoperable for some reason. This failover function can be programmed to activate the secondary connection in specified situations, for example:

i. Elapsed time with no communication with the OC 14,
ii. Critical message from the field device 12 is not received by OC 14,
iii. Detected primary communications network failure, and/or
iv. Detected primary communications hardware failure.

With the addition of a second connection, the UH 10 can also perform most-favored/least-favored routing of data sent between the RTU/field equipment 12 and the OC 14 (this process is referred to as transceiver routing). For example, data transmitted between certain hours may be sent through a primary (favored) connection, whereas data transmitted outside of those hours may be sent through the secondary (alternate) connection to take advantage of favorable network usage rates.

The transceiver communications module 22 can be physically implemented any of a variety of manners, for example:
i. All functionality can be directly integrated onto a UH 10 system circuit board,
ii. All functionality can be integrated onto a removable plug-in module, or
iii. Individual functionalities may be implemented within separate, removable plug-in modules.

A presently preferred implementation utilizes the modular concept as opposed to direct integration in a system circuit board. By modularizing the components, the UH 10 can be easily serviced in the field (e.g., through simple module replacement in the event of a failure rather than board-level troubleshooting or complete replacement of a UH 10). Further, the UH 10 can be easily upgraded in the event the transmission medium between the UH 10 and the OC 14 is changed.

Figure 2B:
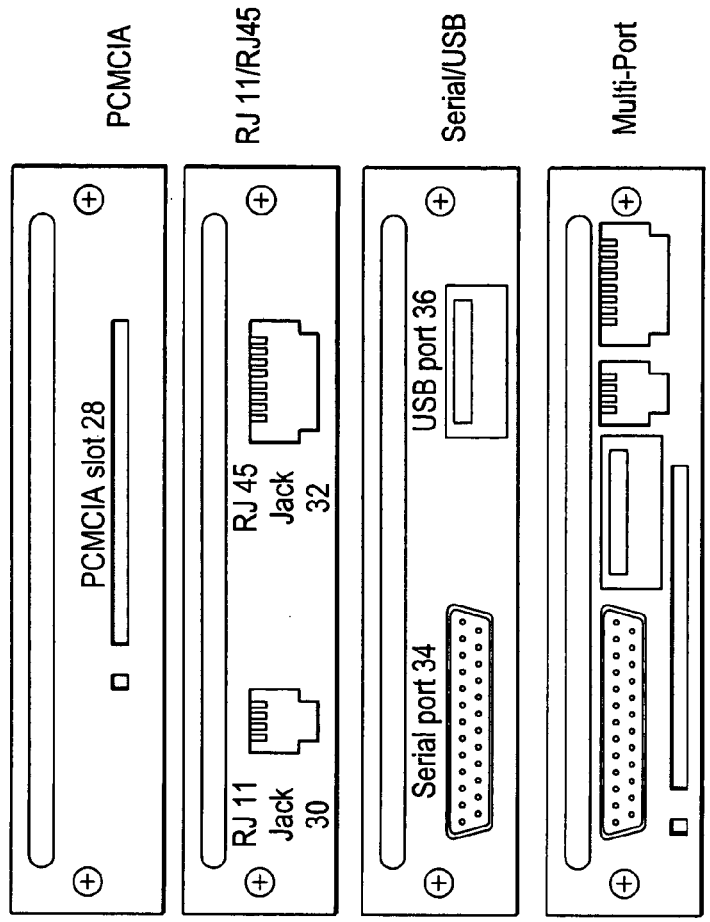
FIG. 2B illustrates various side views of the transceiver communication module of FIG. 2A, showing in particular communication ports thereof.
Figure 2A:
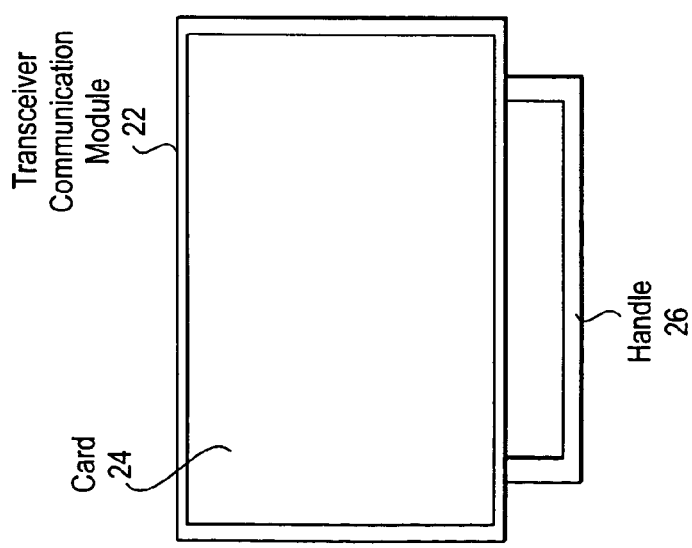
FIG. 2A illustrates a top view of a transceiver communication module suitable for use with the universal hub shown in FIG. 1.

One example of the modularized transceiver communications module 22 is shown in FIGS. 2A and 2B. FIG. 2A is a top view of the outline of the transceiver communications module 22, showing a modular card 24 with a handle 26 for easy insertion/removal from the UH 10. Thumbscrews or other fastening devices may be provided for securing the transceiver communications module 22 within the UH 10 chassis. The transceiver communications module 22 may thus be configured as a printed circuit board (or boards) having electrical components mounted thereon and fitted with an interface that allows for communication with the hub module 18. The board(s) may be carried on a rigid frame that includes handle 24.

FIG. 2B shows side views of various examples of transceiver communication module 22, with each view showing different communication interfaces to couple the module 22 to its associated transceiver. In one example, a PCMCIA slot 26 is provided to accept transceivers such as the iO1000 modem that conform to a PCMCIA form factor. Another example shows the module 22 having RJ 11 and/or RJ 45 jacks (30 and 32, respectively). This configuration may be used where the module 22 includes an analog modem and needs to interface with a convention telephone line or where an external digital (i.e., DSL or ISDN) modem is used and an Ethernet cable is needed to connect the module 22 thereto.

Other alternatives provide transceiver communication module 22 with a serial port 34 and/or a USB port 36. These configurations are useful in cases where an analog modem is external to the module 22. Of course, one may combine some or all of these alternatives into a multi-port variant of the transceiver communication module 22, as shown.

The design of the device communication module 20 also follows the hub-and-spoke philosophy. The device communication module 20 communicates with the RTU directly connected to the RTU/field equipment 12. The versatility of the device communication module 20 is that it is able to communicate with a number of different types of RTUs.

In addition to communicating with RTUs, the device communication module 20 is also configured to control and monitor some forms of field equipment directly (for example, primary distribution alarm and control devices (PDACs)). These are devices that do not have on-board intelligence systems and are controlled usually through simple voltage-level signals or dry contacts and may have one or two simple means (e.g., switches) to determine state.

The device communication module 20 is further designed to allow for communication with the RTUs and/or field equipment via the following types of interfaces:
  i. Serial:
    1. RS-232
    2. RS-422
    3. RS-485
    4. USB
    5. Other serial connections/protocols
  ii. Ethernet (e.g., for TCP/IP networks and/or LANs)
  iii. Multi Out (a UH-to-UH interface used to control multiple devices and/or other UH units)
  iv. Control Out (a custom interface used to connect the device communication module 20 to non-intelligent field devices (e.g., PDACs))

As was the case for the transceiver communication module 22, the hub module 18 will provide power for the device communication module 20. The hub module 18 will act as a centralized power distribution center, providing appropriate power to the device communication module 20 as required. Power redundancy and failover operation may be provided, as described above. In cases where power needs to be provided to a Control Out port, device communication module 20 may utilize a charge circuit and this interface may be powered by either the backup battery or primary power.

The device communication module 20 has two main functions:
  i. Transferring data to and from the hub module 18, and
  ii. Transmitting and receiving data to and from the RTU/field equipment 12 or non-intelligent field devices (e.g., PDACs).

As was the case for the transceiver communication module 22, for sensitive installations, device communication module 20 may be equipped with an encryption/decryption unit so that information passed between the device communication module 20 and the RTU/field equipment 12 is encrypted.

Figure 3B:
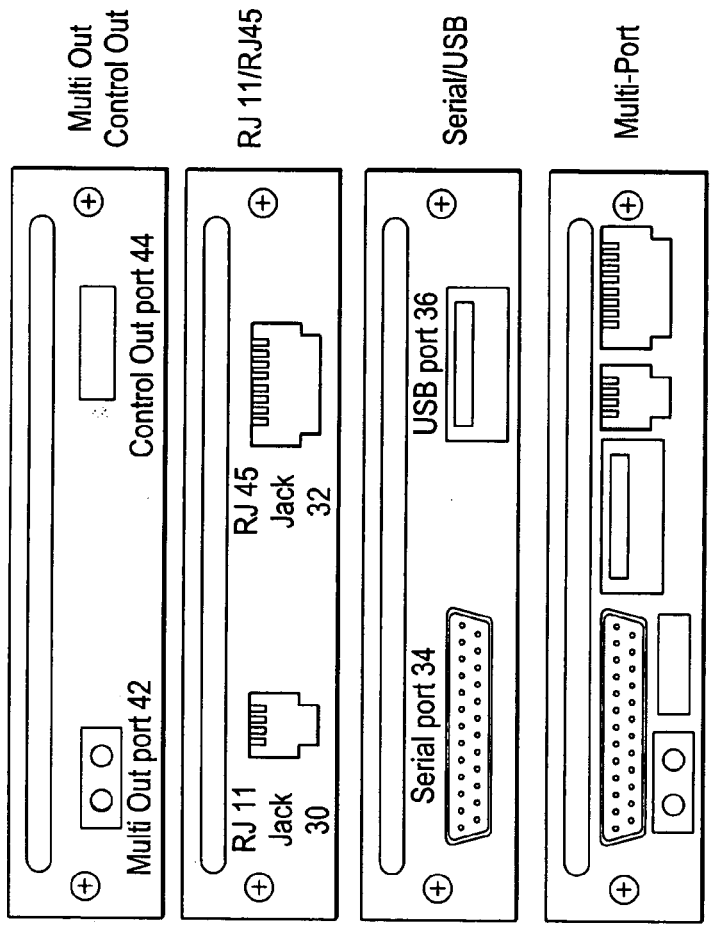
FIG. 3B illustrates various side views of the device communication module of FIG. 3A, showing in particular communication ports thereof.
Figure 3A:
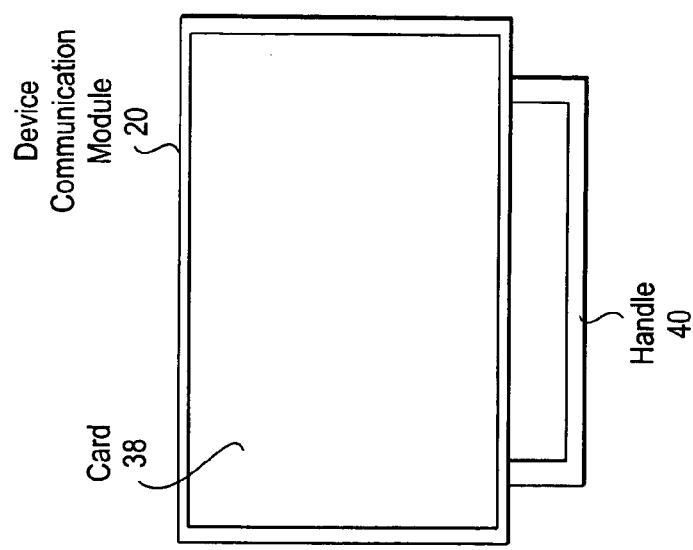
FIG. 3A illustrates a top view of a device communication module suitable for use with the universal hub shown in FIG. 1.

The device communication module 20 can be physically implemented any of a variety of ways, including:
  i. All functionality can be directly integrated onto the UH 10 system circuit board (e.g., as part of hub module 18),
  ii. All functionality can be integrated onto a removable plug-in module, and
  iii. Individual functionalities can be placed onto separate, removable plug-in modules A presently preferred implementation makes use of the module concept and an example of a device communication module 20 configured in accordance with this design is shown in FIGS. 3A and 3B. By modularizing the components, the UH 10 can be easily serviced in the field (e.g., through simple module replacement in the event of a failure rather than board-level troubleshooting or complete replacement of a UH 10). Further, the UH 10 can be easily upgraded in the event the field equipment and/or RTU is/are changed.

FIG. 3A is a top view of the outline of the device communication module 20, showing a modular card 38 with a handle 40 for easy insertion/removal from the UH 10. Thumbscrews or other fastening devices may be provided for securing the device communication module 20 within the UH 10 chassis. The device communication module 20 may thus be configured as a printed circuit board (or boards) having electrical components mounted thereon and fitted with an interface that allows for communication with the hub module 18. The board(s) may be carried on a rigid frame that includes handle 40.

FIG. 3B shows side views of various examples of device communication module 20, with each view showing different communication interfaces to couple the module 20 to its associated RTU/field equipment 12. In one example, a multi out port 42 and/or control out port 44 are provided. The multi out port is adapted for communications between UH 10 and another UH 10, such as may be needed at installations where multiple sets of field equipment are being monitored. In some cases, this may be a conventional serial, USB, Ethernet or other well know computer/peripheral communication interface, though in other cases it may be a specially configured communication interface. The control out port 44 is specially adapted for communication with field equipment 12 that does not have an associated RTU. In such cases, the control out port 44 must be configured to accommodate inputs/outputs provided by the field equipment manufacturer. These may be conventional serial or other communication ports, but more likely will need to be custom designed interfaces that make use of various digital to analog converters in order to provide voltage levels compatible with the field equipment.

Another example of device communication module 20 provides RJ 11 and/or RJ 45 jacks (30 and 32, respectively). This configuration may be used where the module 20 includes an analog modem and needs to interface with a convention telephone line or where an external RTU is accessible via an Ethernet cable. Other alternatives provide device communication module 20 with a serial port 34 and/or a USB port 36. These configurations are useful in cases where the RTU is capable of serial communication. Of course, one may combine some or all of these alternatives into a multi-port variant of the device communication module 20, as shown.

The hub module 18 is the communications portal between the transceiver communication module 22 and the device communication module 20. It acts as the controller for the other modules, as well as adding the core intelligence for the UH 10.

The hub module 18 communicates with the transceiver communication module 22 and device communication module 20 internally through a bus (not shown). Depending on the physical implementations of the other modules, this communication can be provided in a variety of ways. For example:
  i. If either the transceiver communication module 22 and/or device communication module 20 are designed to be a modular, plug-in style package, communications between the hub module 18 and the transceiver communication module 22/device communication module 20 may be through a card/module slot similar to a PCI card or similar connector.
  ii. If either the transceiver communication module 22 and/or device communication module 20 are designed as daughter boards connected the hub module 18 system board, communications between the hub module 18 and the transceiver communication module 22/device communication module 20 may be through a cable.

iii. If either the transceiver communication module 22 and/or device communication module 20 are designed to be directly integrated onto the hub module system board, communications between the hub module 18 and the transceiver communication module 22/device communication module 20 will be through a circuit bus.

Figure 4A:
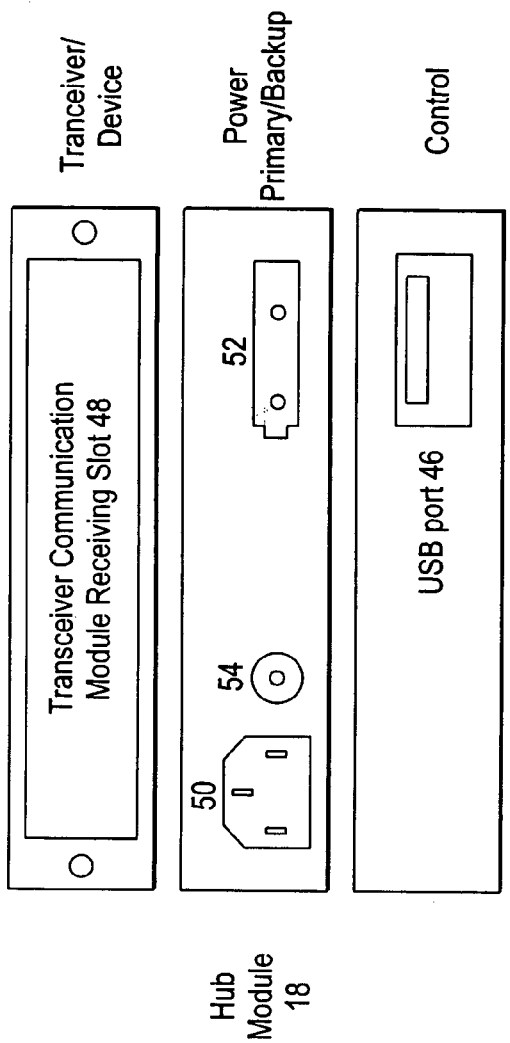
FIG. 4A illustrates various side views of a hub communication module suitable for use with the universal hub shown in FIG. 1, showing in particular communication ports and other interfaces thereof.
Figure 4B:
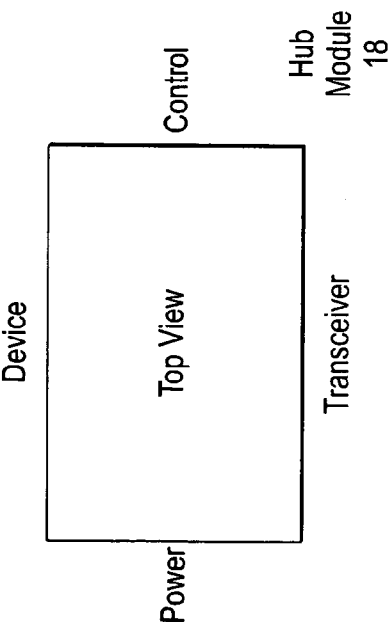
FIG. 4B illustrates a top view of the hub module shown in FIG. 4A.

Additionally, the hub module 18 will have its own external communications port, preferably mounted on the outside of the main device chassis. One example of such a communication port is USB (1.1/2.0) port 46, shown in FIG. 4A. In this illustration, several side views of the hub module 18 are shown. Notice that hub module 18 can accommodate transceiver communication module 22 in a transceiver communication module receiving slot 48. A similar slot (see FIG. 4B) may be provided on another side of the hub module 18 to accommodate the device communication module 20. These slots are fitted with appropriate communication interfaces to allow for information exchange between the modules as described above.

On another side of the hub module 18, various power interfaces may be provided. Preferably, the UH10 will have dual power sources: one primary and one backup.

Conventional AC-110/120 V inputs 50 may be provided to allow for primary power, while a 12V or 24V battery backup input 52 (shown implemented as a 2-pin connector cable connectable to backup battery) my be provided for secondary or backup power. Another option is to provide for DC power input through jack 54.

The hub module 18 has eight main functions. First, the hub module operates to transfer information between the device communication module 20 and transceiver communication module 22 in a pseudo-transparent mode. This means that it will transfer messages between the device communication module 20 and transceiver communication module 22 by default, without performing any packet inspections or translations, but it will also be able to recognize specialized codes in these messages (that would not conflict with normal traffic) that can cause the hub module 18 to intercept the message and perform specific functions (described below).

Second, the hub module may be required to store the address information for the UH 10 and respond to specific polls from the OC 14 to that address. Third, the hub module 18 may intercept messages from the device communication module 20 and/or the transceiver communication module 22 for processing at the hub module 18. This may include instructions to update/alter the hub module 18 or transceiver communication module 22 and/or device communication module 20 as well as to transmit special control instructions to the RTU via the device communication module 20.

Fourth, the hub module 18 is responsible for performing validations to make sure the transceiver communication module 22 is only communicating with a previously designated host (i.e., to prevent communication with a foreign host). Fifth, the hub module 18 performs validations (if necessary) to make sure the device communication module 20 is only communicating with a previously designated RTU/field device (i.e., to prevent communication with a foreign or incorrect type of host).

Sixth, in the event that a large message needs to be sent to the OC 14 (such as a status report, etc.), the hub module 18 may compress the data and then send that compressed data to the OC 14. Any of several types of compression engines may be used for this task and the appropriate compression engine will, to some extent, depend upon the expected volume of traffic to be transmitted.

Seventh, the hub module maintains information on which devices and ports on the transceiver communication module 22 and device communication module 20 are enabled for use and with which devices. This may involve updating software tables during operations. Finally, eighth, the hub module performs self-diagnostics as well as monitoring the health of the transceiver communication module 22 and device communication module 20.

The hub module 18 is preferably implemented as one or more printed circuit boards with the various connections and/or plug-in slots indicated above. In general, the hub module 18 will include a processing engine (either a general purpose programmable microprocessor or reduced instruction set processor, or a field programmable gate array or the like), with associated operating system software and/or firmware and random access memory. In one embodiment, the hub module 18 stores a unique address identifier for the UH 10 in non-volatile memory and uses this identifier when parsing messages received from transceiver communication module 22 to determine if the messages (originally transmitted by OC 14) are meant for the UH 10 and/or its associated field equipment/RTU 12.

In addition to hardware, the hub module 18 includes an on-board software package (OSP). The OSP acts as the communications portal between the transceiver communication module 22 and the device communication module 20, as well as an intelligent management system for the UH 10 and its various modules.

In one operating mode, the OSP allows communications between the transceiver communication module 22 and device communication module 20. The OSP is completely transparent to both the transceiver communication module 22 and device communication module 20 in this mode. While it is not inspecting messages in their entirety, the OSP is looking for specially coded sequences that contain specific UH instructions. These instructions can be used (e.g., by operators at the OC 14) to instruct the UH 10 to perform specific functions (such as compressing or decompressing data before or after encryption, updating RTU operational parameters, or other such functions). In all cases, the specially coded sequences are chosen so as to not conflict with other data sent between the OC 14 and the RTU/field equipment 12.

In one embodiment, the OSP is based on a Linux kernel and has seven software systems or modules:

i. transceiver communication software controller (TSC)— this is a driver for the transceiver communication module 22;

ii. device communication software controller (DSC)— this is a driver for the device communication module 20;

iii. hub software controller (HSC)—this is a driver for the hub module 18;

iv. universal hub logging software (HLS)—this module performs simple logging of activities (updates or upgrades, device/port enable or disable messages, file compression or decompression, address changes, etc.) performed by the UH 10 and the data so collected can be of help in the troubleshooting/diagnosing of faults reported by the UH 10.

v. universal hub diagnostics software (HDS)—this module performs diagnostics on the various modules of the UH 10 to ensure they are functioning properly and, if not, can attempt to reset that service or report an error condition to operators at the OC 14. The device will check the following vi. universal hub watchdog software (HWS)—this module watches for feature lockups and attempt to start the diagnostic system and/or restart/reboot specific modules or the whole UH 10 when error conditions are detected.

vii. universal hub update/upgrade manager (HUUM)—this module provides for updates and upgrades to be performed to the system both remotely and while directly connected to the field equipment/RTU 12.

The OSP is field upgradeable via the USB port 46 on the hub module 18. Changes to activation data and other small driver changes can be made directly via USB port 46, or can be made through special key sequences and data sent through the transceiver communication module 22.

Because the UH 10 is a true computer system with an operating system, it is also possible to download additional programmed functionality to the unit. One or more additional programs can be selected and installed onto the unit based on end-user requirements. These programs can perform functions such as change band monitoring (a program to watch performance norms between pre-determined low points and high points), exception reporting (reporting when change band parameters have been crossed), and other functions. In some cases, an RTU or other field equipment 12 that the UH 10 is connected to may not support these functions on its own (a non-intelligent device) so the UH 10 can be used to add that functionality.

Further, the UH 10 may add additional message encryption as required by the operator. This makes the unit especially well suited to sensitive installations. Encryption options include, but are not limited to, MD5, RSA, DES, triple-DES (3-DES), and IP-SEC. Likewise, additional message compression may be added, as required. Thus, historical or other large data files may be compressed (optionally encrypted) and downloaded to the OC 14 using the regular communication channel between UH 10 and OC 14.

Thus, a modular SCADA communication apparatus and a related system in which the apparatus finds particular use have been described. Although the present invention has been described with reference to particular illustrated embodiments thereof, this discussion was not meant to be limiting in nature. Rather, the discussion was provided in order to communicate one example of the present invention, the true measure of which is best considered by reference to the claims, which follow.

What is claimed is:

1. A modular SCADA communication apparatus adapted for relaying messages between an operations center and an equipment unit remote from the operations center, the communication apparatus comprising:
   a device communication module configured to directly connect to the equipment unit and to optionally encrypt/decrypt information passed between the device communication module and the equipment unit under the control of a controller;
   a transceiver communication module configured to communicate with the operations center via one or more designated communication networks using one or more associated transceivers so as to transfer data to and from the equipment unit and to optionally encrypt/decrypt said data, all under the control of the controller;
   a programmable hub module adapted to physically house the device communication module and the transceiver communication module and operative, under control of an associated set of computer-readable instructions, to: (a) act as a communications portal for routing and transcoding messages passing between the device communication module and the transceiver communication module, (b) act as the controller for instructing the device communication module and/or the transceiver communication module to encrypt their respective communications and to instruct the transceiver communication module as to which communication network to utilize in communicating with the operations center, and (c) provide primary and emergency power to the device communication module and the transceiver communication module.

2. The SCADA communications apparatus of claim 1 wherein the device communication module is configured to directly connect to a remote telemetry unit associated with a monitored equipment unit.

3. The SCADA communications apparatus of claim 2 wherein the device communications unit is configured to directly connect to the remote telemetry unit via one or more of a serial port, a universal serial bus port, a PCMCIA interface, an RJ 11 jack, an RJ 45 jack.

4. The SCADA communications apparatus of claim 1 wherein the programmable hub module is further operative, under control of the computer-readable instructions, to respond to polls by the operations center.

5. The SCADA communications apparatus of claim 1 wherein the programmable hub module is further operative, under control of the computer-readable instructions, to recognize codes in control messages received from the operations center, said control messages intended to cause the hub module to perform specific functions.

6. The SCADA communications apparatus of claim 1 wherein the programmable hub module is further operative, under control of the computer-readable instructions, to intercept messages from the device communication module and the transceiver communication module for processing at the hub module.

7. The SCADA communications apparatus of claim 1 wherein the programmable hub module is further operative, under control of the computer-readable instructions, to maintain information concerning ports on the transceiver communication module and device communication module which are enabled for use.

8. The SCADA communications apparatus of claim 1 wherein the programmable hub module is further operative, under control of the computer-readable instructions, to perform self-diagnostics and monitor equipment health of the transceiver communication module and device communication module.

9. The SCADA communications apparatus of claim 1 wherein the transceiver communication module is further configured to perform most-favored/least-favored routing of data sent between the equipment unit and the operations center via a primary (favored) connection or secondary (alternate) connection according to network circumstances.

10. The SCADA communication apparatus of claim 1 wherein the programmable hub module is further operative under the control of the computer-readable instructions to monitor messages to and from the operations center to determine whether any of the messages include instructions for the SCADA communication apparatus.

11. The SCADA communication apparatus of claim 1 wherein the transceiver communication module includes a transceiver having a PCMCIA form factor.

12. The SCADA communication apparatus of claim 1 wherein the transceiver communication module includes a modem adapted for use with a cellular communication network.

13. The SCADA communication apparatus of claim 10 wherein the instructions are selected from a list comprising compressing data, decompressing data, encrypting data, decrypting data, and updating operational parameters for the SCADA communication apparatus.

14. The SCADA communication apparatus of claim 1 wherein the transceiver communication module includes a modem adapted for use with one or more of the following: an analog or digital leased line, a cellular telephone network, a cellular digital packet data service, a GSM packet radio system, a wireless communications system, a satellite communication system, or a TCP/IP communication system.

* * * * *